United States Patent
Elison et al.

(10) Patent No.: US 10,431,780 B2
(45) Date of Patent: Oct. 1, 2019

(54) LEAD-ACID BATTERY COVER WITH HANDLE RETENTION

(71) Applicant: Johnson Controls Technology Company, Plymouth, MI (US)

(72) Inventors: Nicholas E. Elison, Milwaukee, WI (US); Christopher M. Bonin, Glendale, WI (US); Jason D. Fuhr, Sussex, WI (US)

(73) Assignee: CPS TECHNOLOGY HOLDINGS LLC, New York, NY (US)

( * ) Notice: Subject to any disclaimer, the term of this patent is extended or adjusted under 35 U.S.C. 154(b) by 396 days.

(21) Appl. No.: 15/238,459

(22) Filed: Aug. 16, 2016

(65) Prior Publication Data
US 2017/0229687 A1    Aug. 10, 2017

Related U.S. Application Data

(60) Provisional application No. 62/291,089, filed on Feb. 4, 2016.

(51) Int. Cl.
*H01M 2/10*   (2006.01)
*H01M 10/12*  (2006.01)
*H01M 2/12*   (2006.01)

(52) U.S. Cl.
CPC ....... *H01M 2/1005* (2013.01); *H01M 2/1072* (2013.01); *H01M 2/1252* (2013.01); *H01M 10/12* (2013.01); *H01M 2200/00* (2013.01); *H01M 2220/20* (2013.01); *Y02E 60/126* (2013.01); *Y02P 70/54* (2015.11); *Y02T 10/7016* (2013.01)

(58) Field of Classification Search
CPC .................................................. H01M 2/1005
See application file for complete search history.

(56) References Cited

U.S. PATENT DOCUMENTS

| | | | |
|---|---|---|---|
| 5,440,785 A | | 8/1995 | McDonald |
| 5,670,274 A | * | 9/1997 | Forrer ................. H01M 2/1005 16/423 |
| 5,814,422 A | * | 9/1998 | Vezina ................ H01M 2/1005 16/406 |
| 6,117,588 A | | 9/2000 | Campbell et al. |
| 6,942,945 B2 | | 9/2005 | Andersen et al. |
| 7,836,556 B1 | | 11/2010 | Medeiros |
| 8,263,257 B2 | | 9/2012 | Bielawski et al. |
| 2003/0059669 A1 | * | 3/2003 | Mittal ................. H01M 2/0242 429/82 |

FOREIGN PATENT DOCUMENTS

JP    2001155705    6/2001

* cited by examiner

*Primary Examiner* — Wyatt P McConnell
(74) *Attorney, Agent, or Firm* — Fletcher Yoder, P.C.

(57) ABSTRACT

The present disclosure relates generally to the field of lead-acid batteries. More specifically, the present disclosure relates to handle retention features that are integrated into the packaging of lead-acid batteries. A disclosed lead-acid battery includes a battery handle assembly having a woven fabric strap with a pair of tabs, wherein each tab includes polymer overmolded about a respective end of the strap. The battery also includes a polymer packaging having a cover, wherein a top portion of the cover defines a pair of slots. Each slot is engaged with a respective tab of the battery handle assembly, and wherein each slot includes a respective retention feature that blocks the respective tab from disengaging from the slot.

23 Claims, 9 Drawing Sheets

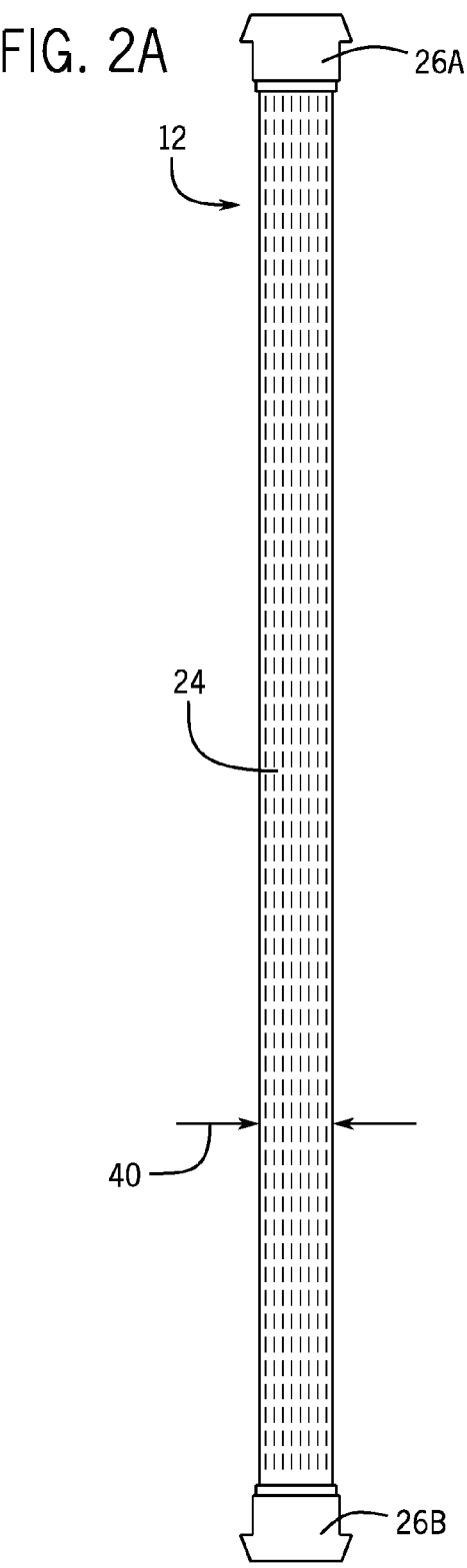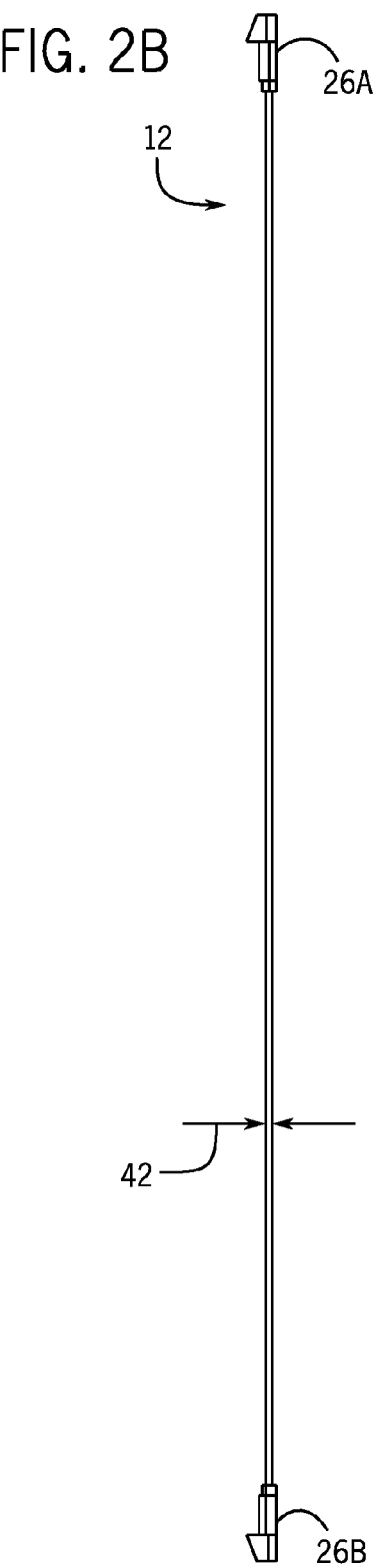

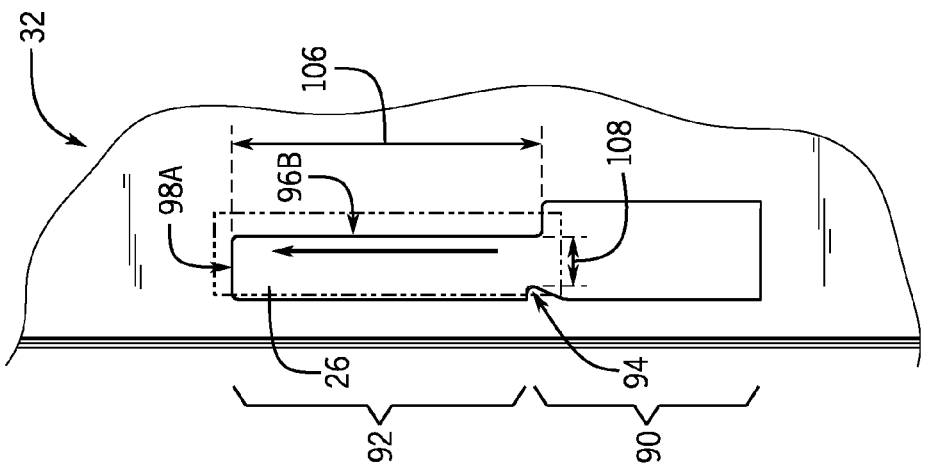
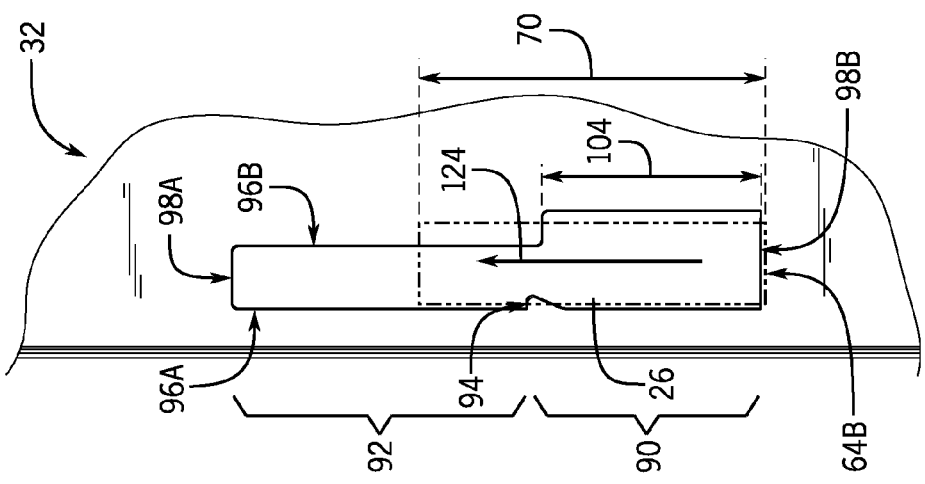
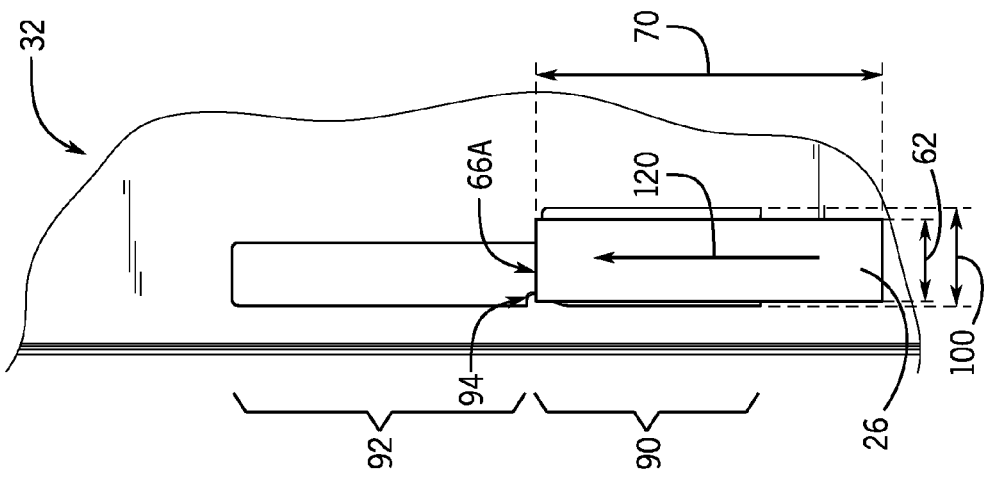
FIG. 6C
FIG. 6B
FIG. 6A

LEAD-ACID BATTERY COVER WITH HANDLE RETENTION

CROSS REFERENCE TO RELATED APPLICATIONS

This application claims priority from and the benefit of U.S. Provisional Application Ser. No. 62/291,089, entitled "LEAD-ACID BATTERY COVER WITH HANDLE RETENTION," filed Feb. 4, 2016, which is hereby incorporated by reference in its entirety for all purposes.

BACKGROUND

The present disclosure relates generally to the field of lead-acid batteries. More specifically, the present disclosure relates to handle retention features that are integrated into the packaging of lead-acid batteries.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Lead-acid batteries are widely used for storage of electrical charge for numerous automotive applications. For example, in addition to cars and trucks, automotive lead-acid batteries are commonly used to store and provide power for operating components of boats, power-sports vehicles, and recreational vehicles, such as jet skis and all-terrain vehicles (ATVs). Lead-acid batteries generally include an outer packaging that houses and protects the internal elements of the battery. Certain large-capacity lead-acid batteries can weigh a considerable amount (e.g., in excess of 50 pounds). As such, the packaging of such batteries usually includes features, such as handles or grips, to enable the customer to lift, transport, and position the battery. To ensure durability, such handles may be expected to withstand several times (e.g., more than two to three times) the weight of the battery under various conditions (e.g., at room temperature, at elevated temperatures, at low temperatures).

However, it is not recognized that battery handles that extend or protrude away from the surface of the packaging can present problems. For example, when the batteries are stacked on a pallet for shipping, if each battery includes a handle that extends from the top of its packaging, then the handles of the batteries located in the lower portion of the stack may be significantly stressed under the weight of batteries positioned above. As a result, shipments of batteries may unacceptably arrive at the customer having broken or damaged handles.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a lead-acid battery that includes a battery handle assembly having a woven fabric strap with a pair of tabs, wherein each tab includes polymer overmolded about a respective end of the strap. The battery also includes a polymer packaging having a cover, wherein a top portion of the cover defines a pair of slots. Each slot is engaged with a respective tab of the battery handle assembly, and wherein each slot includes a respective retention feature that blocks the respective tab from disengaging from the slot.

The present disclosure also relates to a method of manufacturing a lead-acid battery, including forming a polymer packaging of the lead-acid battery, wherein the packaging includes a cover that defines a first slot that includes a respective loading portion, a respective locking portion adjacent to and more narrow than the loading portion of the first slot, and a respective retention feature disposed between the loading portion and the locking portion of the first slot. The method also includes securing a battery handle assembly to the cover of the packaging to form the lead-acid battery, comprising: loading a first tab of a battery handle assembly into the loading portion of the first slot and sliding the first tab into the locking portion of the first slot until the first tab is engaged by the retention feature, wherein the first tab comprises a polymer overmolded about a first end of a strap of the battery handle assembly.

The present disclosure further relates to a lead-acid battery that includes a packaging having a cover, wherein a top portion of the cover includes a slot configured to engage with a tab of a battery handle assembly. The slot includes a loading portion having a width that is greater than a width of the tab, a locking portion having a width that is less than the width of the tab, and a retention feature disposed between the loading portion and the locking portion of the slot. The retention feature is configured to compress to allow the tab to pass from the loading portion of the slot and into the locking portion of the slot to secure the tab within the slot, and configured to subsequently expand to block the tab from freely returning to the loading portion of the slot.

DRAWINGS

Various aspects of this disclosure may be better understood upon reading the following detailed description and upon reference to the drawings in which:

FIGS. 1A, 1B, and 1C illustrate different views of a lead-acid battery having a battery handle assembly engaged with a cover of the battery, in accordance with embodiments of the present technique;

FIGS. 2A and 2B illustrate different views of the battery handle assembly of the battery illustrated in FIGS. 1A-C, in accordance with embodiments of the present technique;

FIGS. 3A, 3B, and 3C illustrate different views of a tab of the battery handle assembly illustrated in FIGS. 2A-B, in accordance with embodiments of the present technique;

Figure 7A:
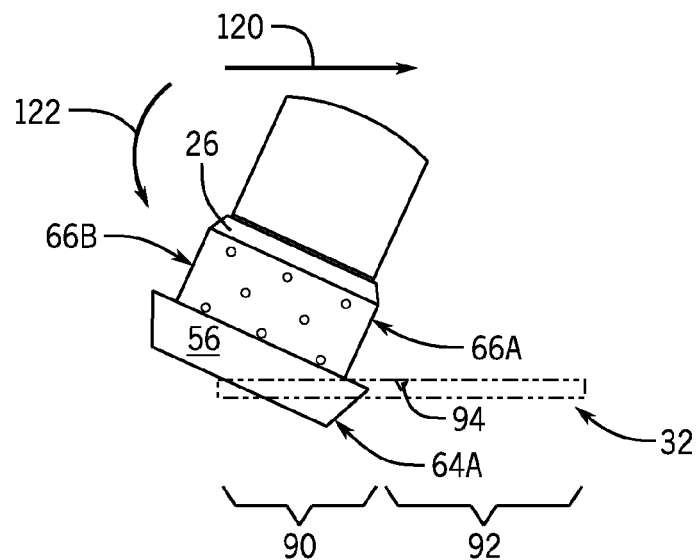
Figure 7B:
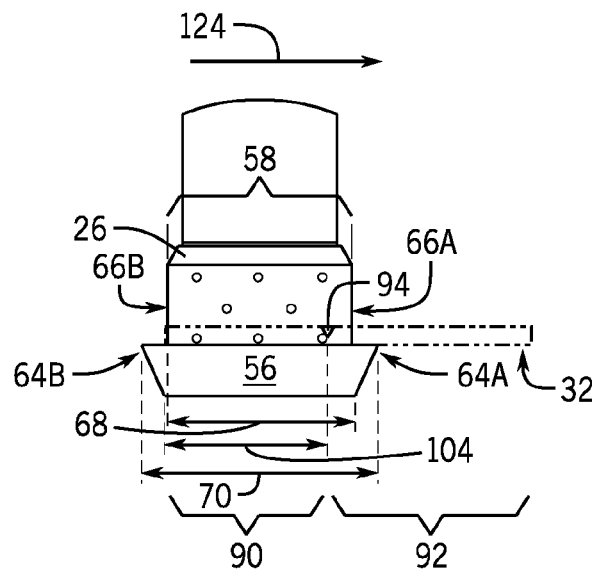
Figure 7C:
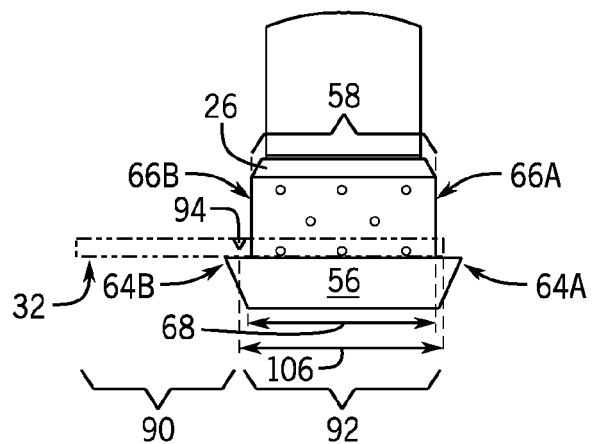

FIGS. 6A, 6B, and 6C are top-down schematic views illustrating a method of loading the tab illustrated in FIGS. 5A-C into the slot illustrated in FIG. 3, in accordance with embodiments of the present technique; and FIGS. 7A, 7B, and 7C are end-on schematic views illustrating the method of loading the tab illustrated in FIGS. 6A-C, in accordance with embodiments of the present technique.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, battery handles are useful features for lifting and moving batteries, particularly large lead-acid batteries employed in vehicles. However, when batteries are stacked for shipping, handles with limited flexibility that extend or protrude away from the surface of the packaging of the battery may suffer from damage during transport. Further, battery handle retention mechanisms that extend or protrude outwardly from the sides of the battery packaging increase the dimensions (e.g., length, width) of the battery. As a result, such handle retention mechanisms are generally more vulnerable to damage during transport and may cause installation issues that can render the battery unsuitable for certain applications that impose tight tolerances on the dimensions of the battery.

Therefore, it is presently recognized that it is desirable to utilize more flexible and durable battery handles for certain applications to prevent damage to the handles during shipping. Further, it is also presently recognized that, by including the battery handle retention mechanisms as features that are inset in the cover of the battery, the retention mechanisms are not easily damaged during transport and installation of the battery and do not increase the dimensions (e.g., width, length) of the battery. Accordingly, present embodiments are directed toward batteries having highly flexible battery handle assemblies that can lay flat against the cover of the battery when the handle is not in use, wherein these battery handle assemblies are attached to the battery using retention mechanisms that are inset in the cover of the battery.

As discussed in greater detail below, the disclosed battery handle assembly generally includes a woven fabric strap having two overmolded polymer tabs disposed on both ends. To secure the handle assembly to the battery, the tabs of the handle assembly are loaded into corresponding battery retention mechanisms in the form of specially shaped slots that are defined in the top of the cover of the polymer packaging of the battery. Additionally, certain embodiments of the disclosed slot designs are compatible with tab designs of certain existing battery handle assemblies. Further, as discussed in greater detail below, in certain embodiments, the disclosed slot design provides an audible and/or tactile confirmation of engagement (e.g., a snap engagement) of the tab of the handle assembly, which enables the assembler to have confidence that the tab is securely locked within the slot. As such, the disclosed slot design allows for ready manufacture and assembly, while also remaining securely engaged with the tab of the battery handle after assembly, even if the battery changes orientation.

Figure 1A:
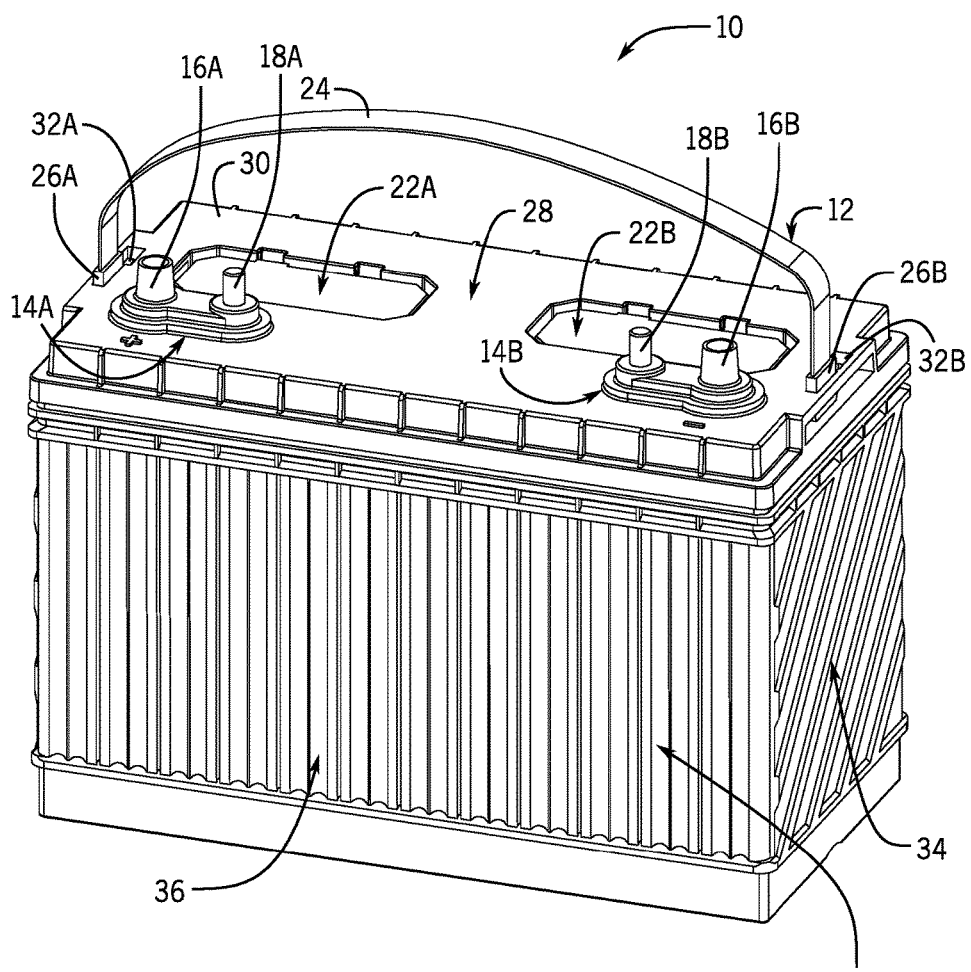
Figure 1B:
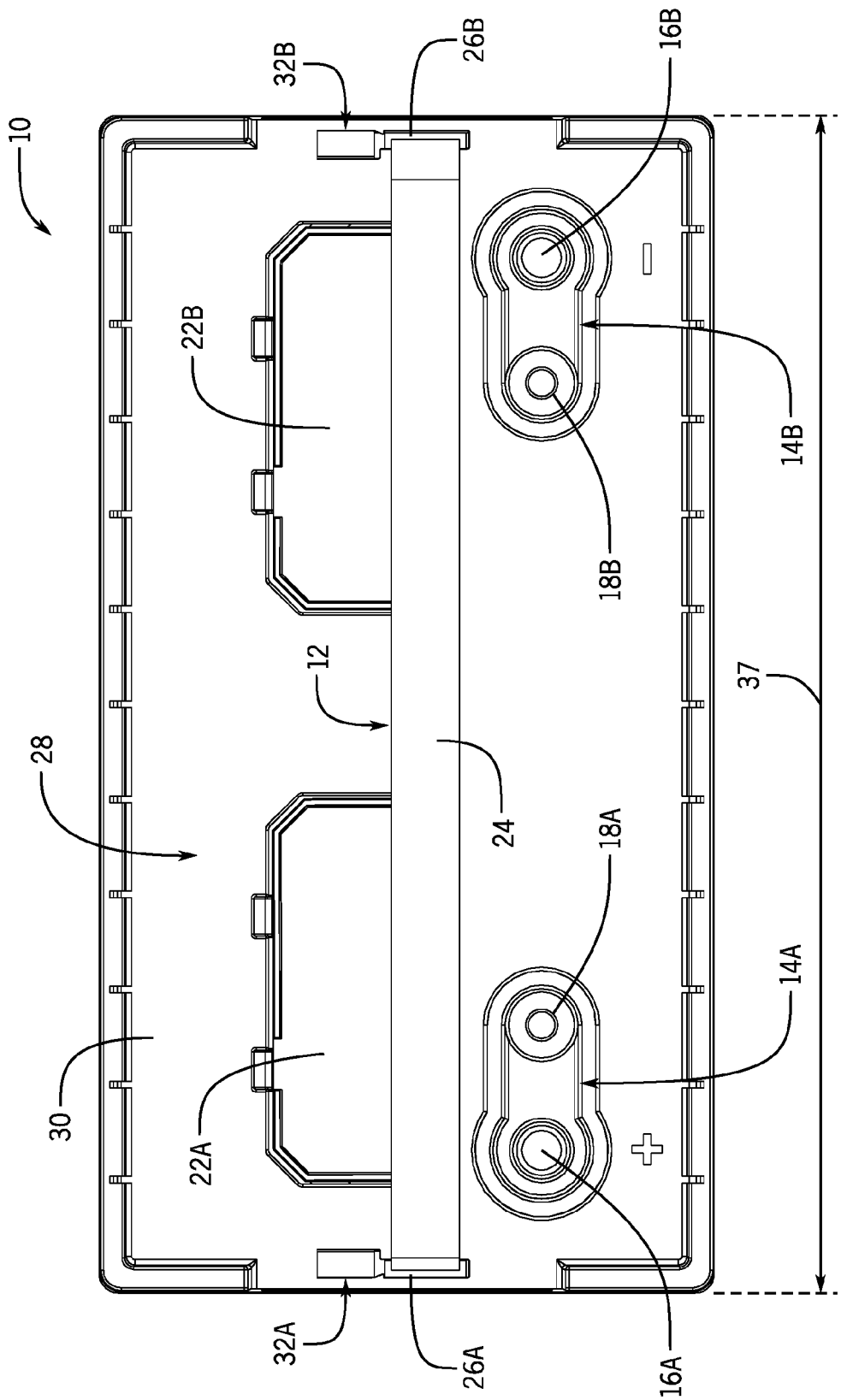
Figure 1C:
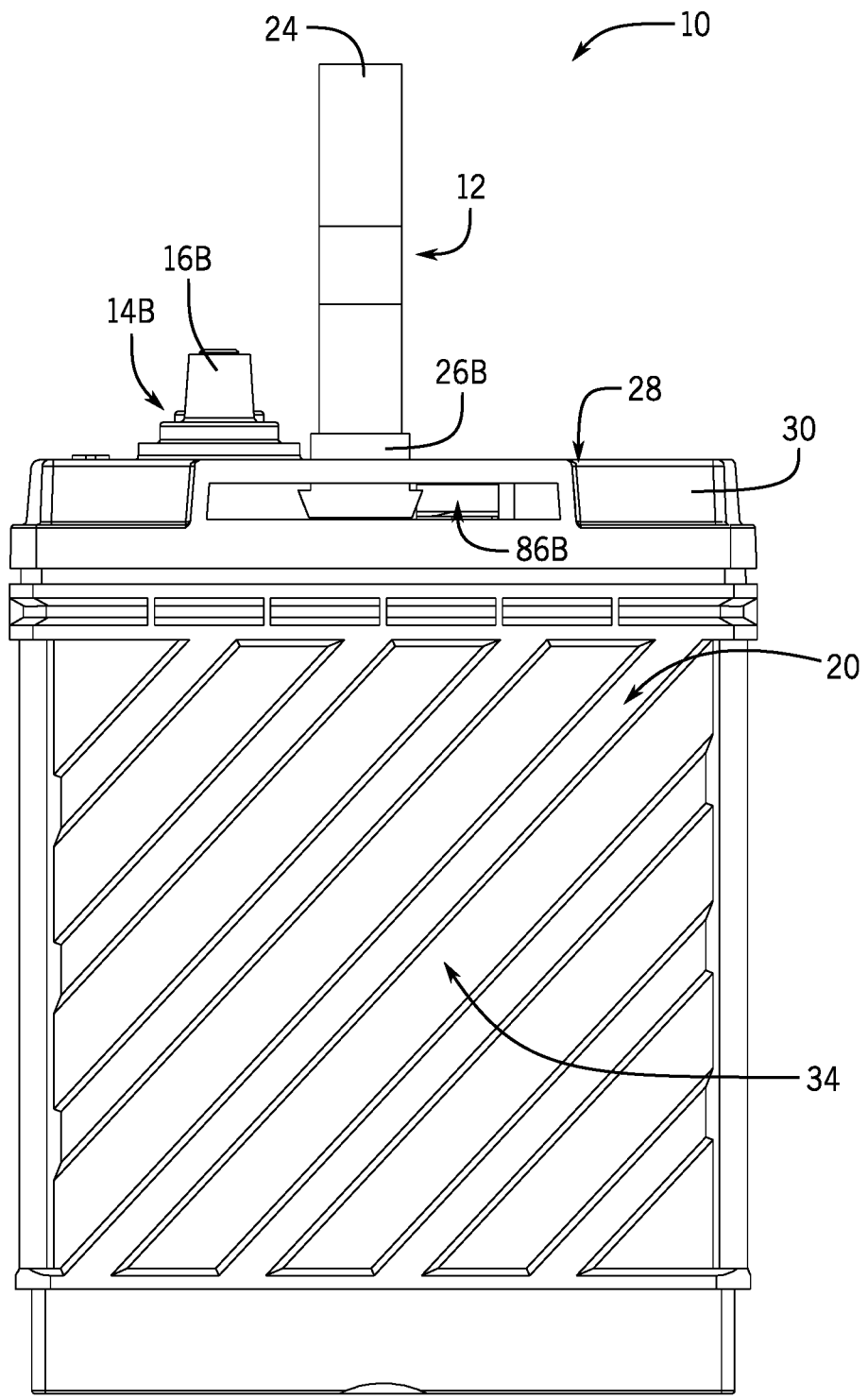

With the foregoing in mind, FIGS. 1A, 1B, and 1C illustrate different views of an example of a lead-acid battery 10 having an attached battery handle assembly 12, in accordance with embodiments of the present approach. It may be generally appreciated that, due to the density of lead, in certain embodiments, the illustrated battery 10 may weigh 50 lbs. or more, depending on the capacity of the battery 10. In certain embodiments, the battery 10 may be an automotive battery used to provide electrical power to a vehicle, such as a car, truck, recreational vehicle, or boat via terminals 14 (e.g., 14A and 14B). By specific example, in certain embodiments the battery 10 may be a marine battery, which tend to have high capacities and greater weight for providing reliable power in harsh marine environments.

For the illustrated battery 10, each of the terminals 14A and 14B includes both a standard, smooth terminal post 16 (e.g., 16A and 16B) and a threaded terminal post 18 (e.g., 18A and 18B) that are electrically connected, respectively. Additionally, these terminals 14 are electrically connected to the lead-acid power producing components within the packaging 20 of the battery 10 to enable the user to electrically couple the battery 10 to a load using different types of coupling mechanisms (e.g., threaded connectors, standard terminal post connectors). In other embodiments, other types of terminals 14 may be used (e.g., different types of male and/or female connectors), in accordance with the present disclosure. Indeed, the presently disclosed handle assembly 12 may be used with any number of different lead-acid battery designs (e.g., absorbent glass mat (AGM) batteries, wet cell or flooded batteries, gel cell batteries, etc.) with any suitable electrical connections, in accordance with the present disclosure.

Additionally, the illustrated battery 10 includes venting features (discussed below) that are disposed below the illustrated vent covers 22 (e.g., 22A and 22B). The vent covers 22 generally cover the venting features to prevent dust and debris from entering the packaging 20 of the battery 10, while still allowing accumulated gases to escape the interior of the packaging 20 from the underlying venting features, as discussed in greater detail below. In some embodiments, the venting features may specifically enable the release of gases while substantially blocking the release of liquids (e.g., acid, electrolyte) from exiting the packaging 20 of the battery 10. In certain embodiments, these venting features may enable additional functionality, such as making the battery 10 service accessible in case the battery 10 needs additional water or acid added to the interior of the packaging 20. In certain embodiments, the venting features may be or include flame arrestors, which generally function to capture and block an open flame (e.g., an ignition source) from entering and igniting gases (e.g., hydrogen, oxygen) within the packaging 20 of the battery 10. It may be appreciated that, unlike other handle designs, the soft and flexible nature of the disclosed handle assembly 12 prevents the handle assembly 12 from damaging (e.g., cracking, bending, breaking) the vent features or vent covers 22 during shipping and use. Further, as discussed below, the disclosed handle assembly 12 does not hamper or impair the ability of the vent features of the battery 10 from functioning properly.

The handle assembly 12 of the battery 10 illustrated in FIGS. 1A-C includes a woven fabric strap 24, which serves as the gripping portion of the handle assembly 12, and is secured to the polymer packaging 20 of the battery 10 via a pair of overmolded polymer tabs 26 (e.g., 26A and 26B). Both the handle assembly 12 and the packaging 20 are generally designed to withstand the conditions in which the battery 10 is expected to be operated, including high temperature, low temperature, wet environments (e.g., marine environments, washing treatments during and after manufacturing), and chemical-rich environments (e.g., including sulfuric acid, gasoline, motor oil, transmission fluid, brake fluid, washing fluid, and cleaners) over the life of the battery 10. As such, both the handle assembly 12 and the packaging 20 of the battery 10 are generally made from acid-resistant materials to prevent degradation in the event that acid or acidic fumes are released from the interior of the battery 10 by the aforementioned vent features. In particular, in certain embodiments, the packaging 20 may be made of overmolded or insert molded polypropylene, the tabs 26 may be made of overmolded polypropylene, and the strap 24 may be made of woven polypropylene fibers, all of which are suitably acid-resistant.

As shown in FIGS. 1A-C, a top portion 28 of a cover 30 of the packaging 16 includes slots 32 (e.g., 32A and 32B, also referred to herein as battery handle retention mechanisms) that are defined in (e.g., inset, extends into) the top portion 28 of the cover 30, and that secure the tabs 26 of the handle assembly 12 to the battery 10. As illustrated, in certain embodiments, the slots 32 may be positioned near an end portion 34 or a side portion 36 of the battery 10. For example, in certain embodiments, the slots 32 may be disposed near (e.g., less than 20 mm from, less than 10 mm from, less that 10% of a length 37 of the battery 10 from, less than 5% of the length 37 of the battery 10 from) an end portion 34 of the battery 10. Further, in certain embodiments, the battery handle assembly 12 in combination with the slots 32 may be rated for loads between two and five times the weight of the battery 10, or more, to ensure that these components are robust to different operating environments.

FIGS. 2A and 2B illustrate a plan view and a side elevational view, respectively, of the battery handle assembly 12 illustrated in FIGS. 1A-C, in accordance with certain embodiments of the present approach. A width 40 and thickness 42 of the strap 24 may be selected, at least in part, based on the weight of the battery 10. It may be appreciated that unlike a molded plastic handle, the strap 24 of the illustrated handle assembly 12 is highly flexible, and can be repeatedly bent, folded, rolled, and/or compressed to lay substantially flat against the top portion 28 of the cover 30 of the battery 10, as illustrated in FIGS. 1A-C, without damage.

Figure 3A:
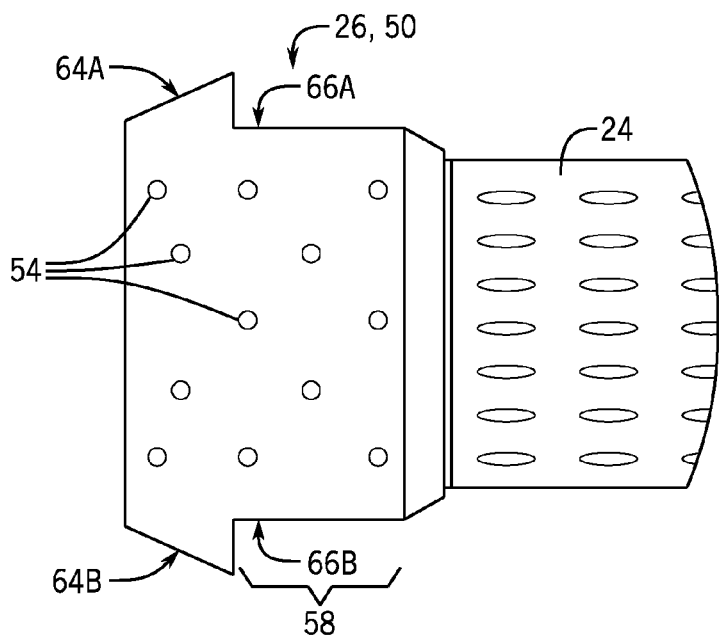
Figure 3B:
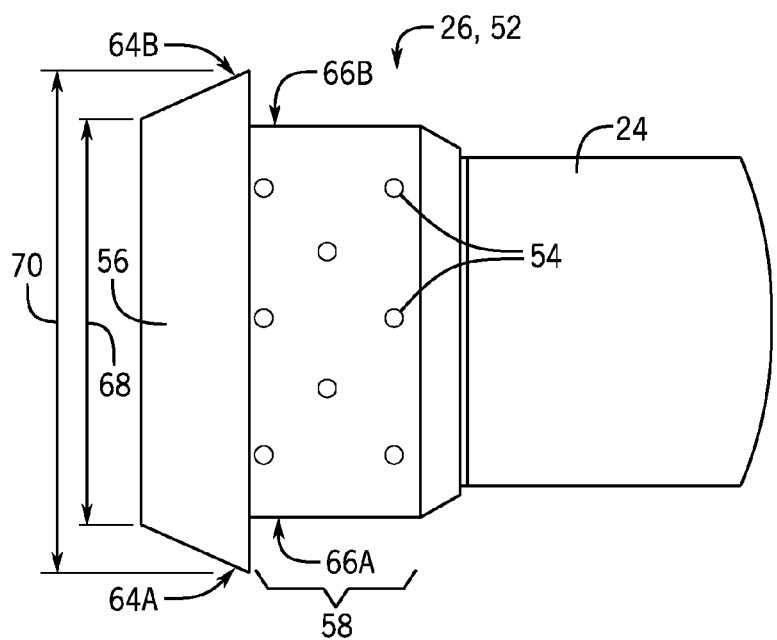
Figure 3C:
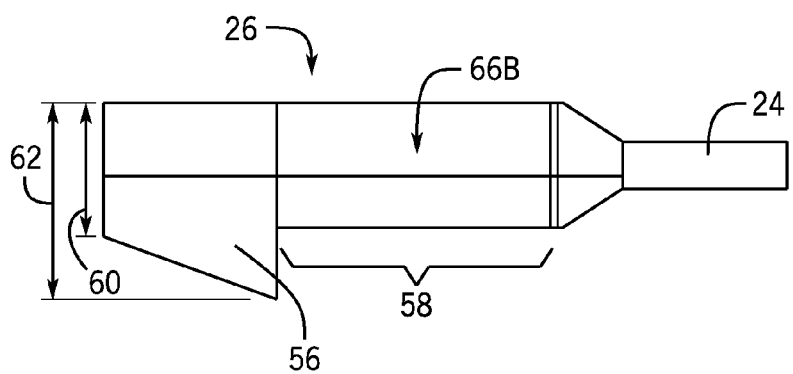

FIGS. 3A, 3B, and 3C illustrate different views to better illustrate the shape and dimensions of the tab 26 (e.g., 26A and 26B) of the battery handle assembly 12 illustrated in FIGS. 2A and 2B, in accordance with embodiments of the present approach. In particular, FIG. 3A illustrates a top-down view of a first side 50 of the tab 26, FIG. 3B illustrates a top-down view of a second side 52 of the tab 26, and FIG. 3C illustrates an end-on view of the tab 26. It may be noted that, for the embodiment illustrated in FIGS. 1A-C the first side 50 of the tab 26 faces outwardly (i.e., toward the outer edge of the cover 30) and the second side 52 of the tab 26 faces inwardly (i.e., toward the vent covers 22) when the tab 26 is engaged within the slot 32.

As shown in FIGS. 3A and 3B, the overmolded tab 26 includes a number of retention features 54, which are impressions left by a plurality of retaining pins that secure the strap 24 in place during the overmolding process. As shown in FIGS. 3B and 3C, the second side 52 of the tab 26 includes a lip 56 that extends or protrudes in a crosswise direction (e.g., perpendicularly) out from the second side 52 of the tab 26. As such, a central portion 58 of the tab 26 is generally narrower (e.g., shorter, thinner) than the portion of the tab that includes the lip 56. More specifically, as illustrated in FIG. 3C, the tab 26 may be described as having a central width 60 in the central portion 58 of the tab 26, as well as a maximum width 62 at the widest portion of the lip 56 of the tab 26. Further, as illustrated in FIGS. 3A and 3B the tab 26 also includes shoulders 64 (e.g., 64A and 64B) that extend or protrude out (e.g., perpendicularly) from respective ends 66 (e.g., 66A and 66B) of the tab 26. As such, as illustrated in FIG. 3B, the tab 26 may be described as having a central length 68 near the central portion 58 of the tab 26, as well as a maximum length 70 at the outermost extent of the shoulders 64. As discussed below, certain dimensions of the tab 26 generally correspond to certain dimensions of the slot 32 to enable the slot 32 to securely engage the tab 26.

Figure 4A:
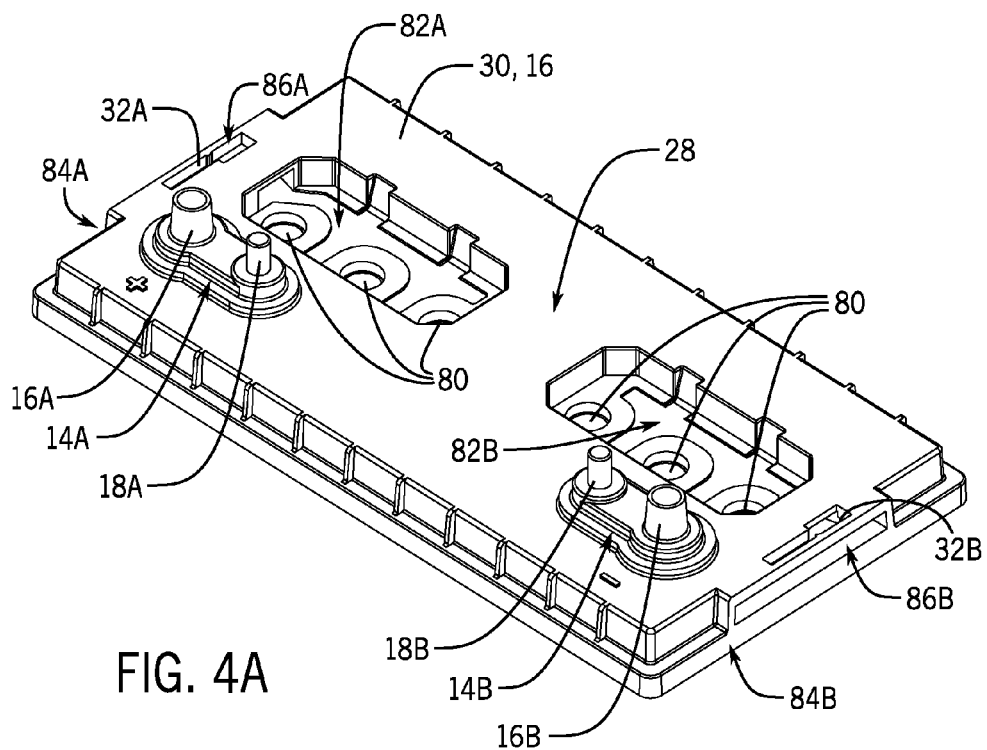
FIGS. 4A and 4B illustrate different views of the cover of the lead-acid battery illustrated in FIGS. 1A-C, in accordance with embodiments of the present technique.
Figure 4B:
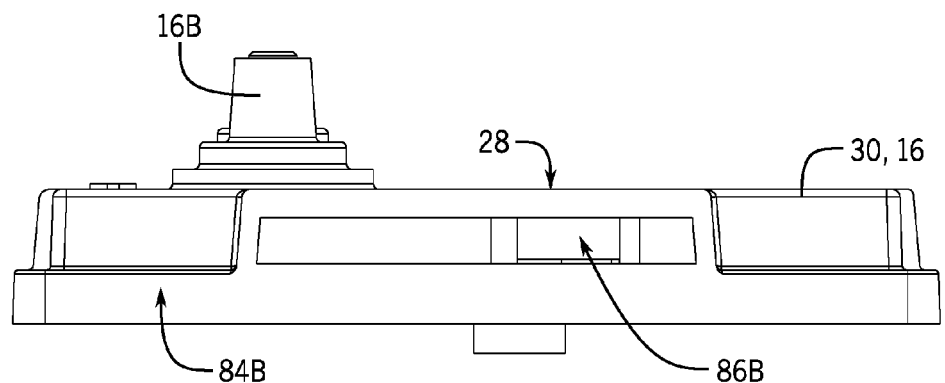

FIG. 4A is a perspective view of the top portion 28 of the cover 30 of the battery 10 illustrated in FIGS. 1A-B, in accordance with certain embodiments of the present technique. In addition to the terminals 14 and the slots 32 discussed above, the cover 30 illustrated in FIG. 4A has the vent covers 22 (as illustrated in FIGS. 1A-C) removed to provide a view of underlying vent features 80 that are disposed in recessed regions 82 (e.g., 82A and 82B) in the cover 30. FIG. 4B is an elevational view of an end portion 84B of the cover 30, wherein the opposite end portion 84A is generally a mirror image of the end portion 84A. FIGS. 4A and 4B illustrate a drainage channel 86B defined in (e.g., inset, extends into) the end portion 84B of the cover 30 and in fluid communication with the recessed region 82B in the top portion 28 of the cover 30. Similarly, as partially illustrated in FIG. 4A, the opposite end portion 84A includes a similar drainage channel 86A that is in fluid communication with the recessed region 82A. These drainage channels 86 (e.g., 86A and 86B) are designed to direct gases vented released by the vent features 80, and/or liquids (e.g., water, brine) that seep around the vent covers 22 (as illustrated in FIGS. 1A-C) and into the recessed regions 82 to be released (e.g., drain) from the end portions 82 of the cover 30. It should be noted that since the slots 32 also extend into and are in fluid communication with these drainage channels 86, it is presently recognized that it is desirable that the tabs 26 of the battery handle assembly 12 do not substantially block (e.g., prevent, obstruct) these drainage channels 86 or otherwise obstruct the release of gases or liquids via these drainage channels 86 once the tabs 26 are engaged within the slots 26.

Figure 5:
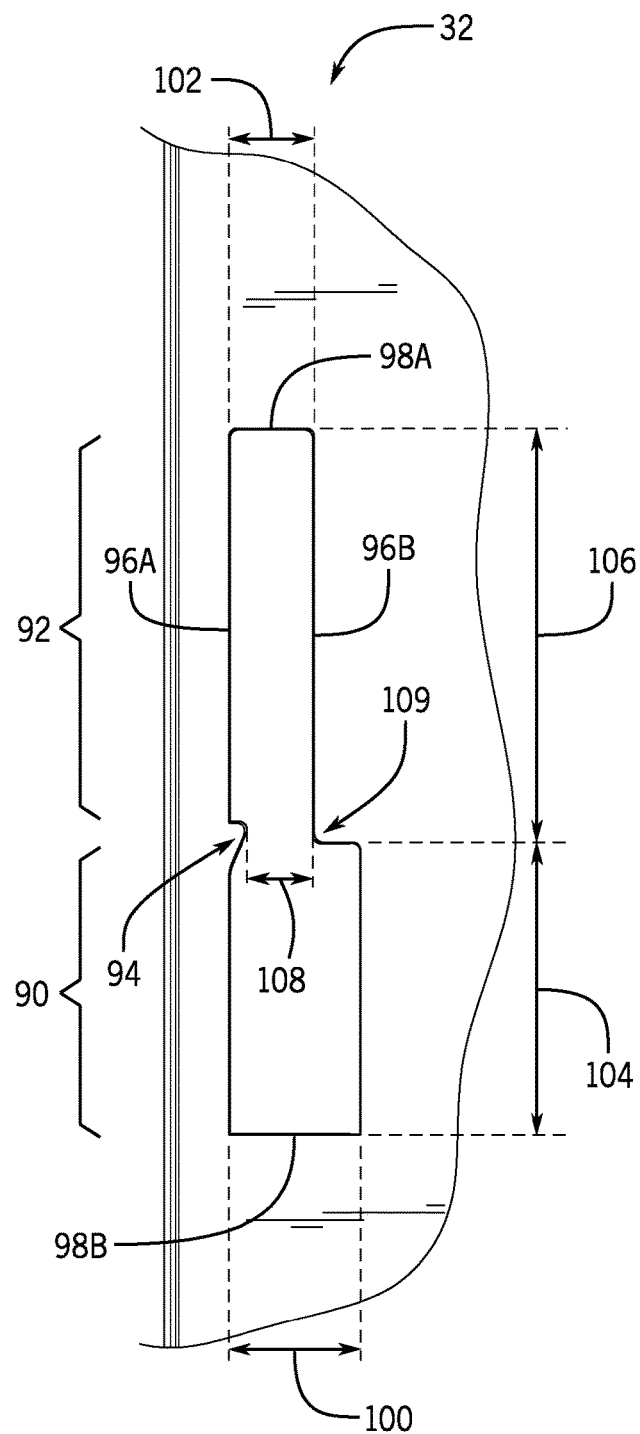
FIG. 5 is an enlarged top-down view of the battery handle retaining slot disposed in the cover illustrated in FIGS. 4A-B, in accordance with embodiments of the present technique.

FIG. 5 is an enlarged top-down view an embodiment of the slot 32 of the cover 30 of the battery 10 illustrated in FIG. 4A, in accordance with embodiments of the present approach. While the illustrated slot 32 has a particular shape, it may be appreciated that the shape of the slot 32 may vary in other embodiments, in accordance with the present disclosure. For the illustrated embodiment, the slot 32 includes a loading portion 90 and a locking portion 92 that are adjacent to (e.g., connected to) one another and separated by a retention feature 94. The illustrated slot 32 may further be described as having sides 96 (e.g., 96A and 96B) and ends 98 (e.g., 98A and 98B). The illustrated retention feature 94 (e.g., angular retention feature 94) extends or protrudes from a single side 96 (e.g., side 96A) of the slot 32 and divides the loading portion 90 from the locking portion 92 of the slot 32. In other embodiments, the slot 32 may contain more than one retention feature 94, a retention feature 94 having a different shape, and/or a retention feature 94 disposed on the opposite side (e.g., 96B) of the slot 32. For the illustrated embodiment, the loading portion 90 of the slot 32 is relatively wider and shorter, while the locking portion 92 of the slot 32 is relatively more narrow and longer. More specifically, the loading portion 90 of the slot 32 has a width 100 that is generally greater than a width 102 of the locking portion 92 of the slot 32, and the loading portion 90 has a length 104 that is generally less than a length 106 of the locking portion 92 of the slot 32.

Further, as mentioned above, the dimensions of the slot 32 correspond to the dimensions of the tab 26, as discussed with respect to FIGS. 3A-C. In particular, for the embodiment of the slot 32 illustrated in FIG. 5, the width 100 of the loading portion 90 of the slot 32 is as wide as or wider than the maximum width 62 of the tab 26, and the length 104 of the loading portion 90 of the slot 32 is less than the central length 68 of the tab 26. Also, for the illustrated embodiment, the width 102 of the locking portion 92 of the slot 32 is less than the maximum width 62 of the tab 26 and only slightly (e.g., 1 mm or less, or between approximately 0.1 mm and approximately 1 mm) wider than the central width 60 of the tab 26. Additionally, the length 106 of the locking portion 92 of the slot 32 is only slightly (e.g., 1 mm or less, or between approximately 0.1 mm and approximately 1 mm) wider than the central length 68 of the tab 26. Further, a distance 108 between the retention feature 94 and an adjacent corner 109 dividing the loading portion 90 from the locking portion 92 of the slot 32 is less than the central width 60 of the tab 26. However, other embodiments of the slot 32 may have different geometric relationships with the tab 26, and vice-versa.

FIGS. 6A-C are top-down schematic views of the tab 26 (illustrated in FIGS. 3A-C) being secured into the slot 32 (as illustrated in FIG. 5), in accordance with embodiments of the present approach. Additionally, FIGS. 7A-C are schematic end-on views of the tab 26 being secured into the slot 32, and correspond to FIGS. 6A-C, respectively. It may be appreciated that, for simplicity, the tab 26 is schematically illustrated as a rectangle in FIGS. 6A-C, with the sides of the rectangle dashed to generally indicate portions of the tab 26 disposed below the sides 96 and ends 98 of the slot 32. It may also be appreciated that the length 70 and width 62 of the rectangle correspond to the maximum length 70 and the maximum width 62 of the tab 26 (as illustrated in FIGS. 3A-C). Furthermore, the slot 32 is schematically represented in FIGS. 7A-C as a dashed rectangle for simplicity in order to demonstrate the position of the tab 26 relative to the loading portion 90 and the locking portion 92 of the slot 32.

With the foregoing in mind, FIGS. 6A and 7A illustrate the first step, in which the tab 26 is loaded into the slot 32. As illustrated, a first end 66A of the tab 26 is inserted into the loading portion 90 of the slot 32. As illustrated, at the same time, the first end 66A of the tab 26 as the tab 26 is rotated 122 (e.g., rocked or twisted) so that the shoulder 64A of the tab 26 is angled under the retention feature 94 and the tab 26 is slid forward 120 (e.g., in a direction substantially parallel to the plane of the end portion 34 of the battery 10, as illustrated in FIG. 1) until the second end 66B of the tab 26 can be inserted into the loading portion 90 of the slot 32. It may be appreciated that, depending on the relative maximum width 62 of the tab 26 and the width 100 of the loading portion 90 of the slot 32, the tab 26 may also be rotated or rocked in other directions (e.g., back and forth, twist slightly) in order to load the tab 26 into the slot 32.

FIGS. 6B and 7B illustrate the tab 26 that is loaded in the slot 32. Since the length 104 of the loading portion 90 of the slot 32 is less than even the central length 68, when the tab 26 is loaded into the slot 26, the first end 66A of the tab 26 extends past (e.g., exceeds) the retention feature 94 and into the locking portion 92 of the slot 32. As such, since the distance 108 between the retention feature 94 and the adjacent corner 109 (illustrated in FIG. 5) is less than the central width 60 (illustrated in FIG. 3C) of the tab 26, the retention feature 94 is compressed toward the side 96A of the slot 32 by the central portion 58 of the tab 26. It may be appreciated that, since the retention feature 94 is polymeric, the retention feature 94 is resilient, and once compressed, it has spring force that drives the retention feature 94 to be restored to its non-compressed state (as illustrated in FIG. 5).

While the tab 26 is not yet locked into slot 32, it may be noted that, in the loaded position illustrated in FIGS. 6B and 7B, the shoulder 64B of the tab 26 is disposed under the end 98B of the slot 32, and the lip 56 of the tab 26 that faces away from the retention feature 94 is partially disposed under the side 96B of the slot 32. As such, while the tab 26 is not fully secured into the locking portion 92 of the slot 32, even in the illustrated loaded position, the tab 26 does not readily fully release from the slot 32. As such, if the retention feature 92 fails to maintain the tab 26 in the locked position (discussed below), and the tab 26 slips back into the loaded position illustrated in FIGS. 6B and 7B, the slot 32 will still continue to resist fully releasing the tab 26. As such, the relative dimensions of the tab 26 and slot 32 enable a graceful deterioration of performance in the event of failure of the retention feature 94, in which the tab 26 has greater freedom to move within the slot 32 without the tab 26 being completely released from the slot 32.

Next, the tab 26 is slid forward 124 to move from the loaded position, as illustrated in FIGS. 6B and 7B, to the locked (e.g., secured, engaged) position, as illustrated in FIGS. 6C and 7C. In particular, the tab 26 is slid forward 124 until the central portion 58 of the tab 26 completely passes the retention feature 94 and is entirely confined within the locking portion 92 of the slot 32. In the illustrated locked position, the retention feature 94 is in abutment with the end 66B of the tab 26 and blocks the tab 26 from freely leaving the locking portion 90 of the slot 32. Since the tab 26 has advanced and is no longer compressing the retention feature 94 against the side 96A of the slot 32, the aforementioned resiliency of the retention feature 94 causes the retention feature 94 to expand back into its non-compressed state. Since the length 106 of the locking portion 90 of the slot 32 is only slightly longer than the central length 68 of the tab 26, the central portion 58 of the tab 26 is securely locked into position, with the shoulders 64A of the tab 26 disposed under the end 98A of the slot 32, with the shoulder 64B disposed under the retention feature 94, and with the lip 56 disposed under the side 96B of the slot 32 to bear the weight of the battery 10. Furthermore, in certain embodiments, the expansion of the retention feature to its non-compressed state, in addition to frictional forces between the surfaces of the tab 26 and the slot 32, generates an audible sound (e.g., a snap, a pop) that provides confirmation to the assembler that the tab 26 is securely engaged in the locking portion 90 of the slot 32. As such, in certain embodiments, the engagement between the slot 32 and the tab 26 may be described as being a snapping engagement.

One or more of the disclosed embodiments, alone or on combination, may provide one or more technical effects including the manufacture of batteries having flexible and durable battery handles that can lay flat against the cover of the battery when the handle is not in use to avoid damage during shipping. Further, the disclosed battery handle retention mechanisms (e.g., slots) are features that are inset in the cover of the battery and do not increase the dimensions (e.g., width, length) of the battery. Further, the disclosed slot design enables audible confirmation of engagement (e.g., a snap engagement) of the tab of the handle assembly, which enables the assembler to have confidence that the tab is securely locked within the slot. Therefore, the disclosed slot design allows for ready manufacture and assembly, and it remains securely engaged with the tab of the battery handle after assembly, even if the battery changes orientation. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A lead-acid battery, comprising:
   a battery handle assembly including a woven fabric strap having a pair of tabs, wherein each tab comprises polymer overmolded about a respective end of the strap; and
   a polymer packaging that contains a lead-acid cell of the lead-acid battery, wherein the polymer packaging includes a cover disposed over an opening of the packaging, wherein a top portion of the cover defines a pair of slots that are inset from a perimeter of the polymer packaging, wherein each slot is engaged with a respective tab of the battery handle assembly, and wherein each slot includes a respective retention feature that blocks the respective tab from disengaging from the slot.

2. The lead-acid battery of claim 1, wherein the retention feature is an angular retention feature that extends from only one side of the slot.

3. The lead-acid battery of claim 1, wherein each slot comprises:
   a loading portion having a first width that is greater than a maximum width of the respective tab of the battery handle assembly; and
   a locking portion adjacent the loading portion and having a second width that is less than the maximum width of the respective tab, and wherein the respective retention feature of the slot is disposed between the loading portion and the locking portion of the slot and blocks the respective tab in the locking portion of the slot to engage the tab.

4. The lead-acid battery of claim 3, wherein the loading portion of each slot has a length that is less than a central length of the respective tab, and wherein the locking portion of each slot has a length that is between 0.1 millimeter (mm) and 1 mm greater than the central length of the respective tab.

5. The lead-acid battery of claim 3, wherein the respective retention feature of each slot is configured to compress to allow the respective tab to pass from the loading portion to the locking portion of the slot, and configured to subsequently expand to engage the respective tab and block the respective tab from freely returning to the loading portion of the slot.

6. The lead-acid battery of claim 3, wherein the respective retention feature of each slot is configured to enter a snapping engagement with the respective tab within the locking portion of each slot.

7. The lead-acid battery of claim 3, wherein each respective tab includes a first side that is substantially flat and a second side, opposite the first, that includes a lip extending outwardly along the length of the tab on the second side, wherein the lip is disposed under a side of the locking portion of each slot that is opposite the respective retention feature of each slot.

8. The lead-acid battery of claim 3, wherein each respective tab includes a first shoulder portion extending outwardly from a first end of the tab and a second shoulder portion extending outwardly from a second end of the tab to yield a maximum length of the tab, wherein the maximum length of each respective tab is greater than a length of the locking portion of each slot such that the first shoulder portion of each respective tab is disposed under an end of the locking portion of each slot, and wherein the second shoulder portion of each respective tab is disposed under the respective retention feature of each slot.

9. The lead-acid battery of claim 1, wherein the retention feature of each slot blocks the respective tab from freely disengaging from the slot even when an orientation of the lead-acid battery changes.

10. The lead-acid battery of claim 1, wherein the cover of the packaging comprises a pair of terminals that are electrically coupled to the lead-acid cell disposed within the packaging, wherein each terminal includes both a terminal post and a threaded terminal.

11. The lead-acid battery of claim 1, wherein the top portion of the cover of the packaging includes recessed portions about a plurality of vent features, wherein the plurality of vent features is configured to release gas accumulated within the packaging during operation of the lead-acid battery, and configured to block an ignition source from entering the packaging of the battery.

12. The lead-acid battery of claim 11, wherein the cover of the packaging includes a respective drainage channel that is fluidly coupled to each of the slots, wherein each drainage channel extends between the recessed portions in the top portion of the cover and a side portion of the cover to allow liquids to drain from the top portion of the cover, and wherein the respective tab engaged in each of the slots does not block the drainage of liquids from the top portion of the cover or block the release of gas from the plurality of vent features.

13. The lead-acid battery of claim 1, wherein the pair of slots of the cover of the packaging and the battery handle assembly, in combination with the battery handle assembly, are capable of sustaining between two and five times the weight of the lead-acid battery.

14. The lead-acid battery of claim 1, wherein the strap of the battery handle assembly is configured to bend or fold to lay substantially flat against the top portion of the cover of the packaging when the battery handle assembly is not in use.

15. A method of manufacturing a lead-acid battery, comprising:
   forming a polymer packaging of the lead-acid battery, wherein the packaging includes a lower portion that defines an opening and a cover that defines a first slot that is inset from a perimeter of the polymer packaging, wherein the first slot includes a respective loading portion, a respective locking portion adjacent to and more narrow than the loading portion of the first slot, and a respective retention feature disposed between the loading portion and the locking portion of the first slot;

adding a lead-acid cell into the lower portion of the polymer packaging and disposing the cover over the opening of the polymer packaging; and securing a battery handle assembly to the cover of the packaging to form the lead-acid battery by performing steps comprising: loading a first tab of a battery handle assembly into the loading portion of the first slot and sliding the first tab into the locking portion of the first slot until the first tab is engaged by the retention feature, wherein the first tab comprises a polymer overmolded about a first end of a strap of the battery handle assembly.

16. The method of claim 15, wherein the cover comprises a second slot that is inset from the perimeter of the polymer packaging, wherein the second slot includes a respective loading portion, a respective locking portion adjacent to and more narrow than the loading portion of the second slot, and a respective retention feature disposed between the loading portion and the locking portion of the second slot, and wherein securing the battery handle assembly to the cover comprises loading a second tab of the battery handle assembly into the second slot and engaging the second tab with the retention feature of the second slot, wherein the second tab comprises the polymer overmolded about a second end of the strap of the battery handle assembly.

17. The method of claim 15, wherein loading the first tab comprises:
   disposing a first end of the first tab of the battery handle assembly into the loading portion of the first slot;
   rotating the first tab to dispose a second end of the first tab into the loading portion of the first slot while sliding the first end of the first tab past the retention feature and into the locking portion of the first slot; and
   securing the first tab within the first slot by sliding the second end of the first tab past the retention feature and into the locking portion of the first slot such that the retention feature engages the second end of the first tab.

18. The method of claim 17, wherein the first end of the first tab has a first shoulder portion and the second end of the first tab has a second shoulder portion, and wherein securing the first tab within the first slot comprises sliding the first shoulder portion under an end of the locking portion of the first slot, wherein the retention feature slides over the second shoulder portion to engage the second end of the first tab.

19. The method of claim 18, wherein securing the first tab within the first slot comprises sliding the second end of the first tab past the retention feature and into the locking portion of the first slot such that the retention feature engages the second end of the first tab with an audible snapping sound to confirm engagement.

20. A lead-acid battery, comprising:
   a packaging comprising side portions and end portions coupled together to define a perimeter and an opening, and comprising a cover configured to be disposed over the opening, wherein a top portion of the cover comprises a slot configured to engage with a tab of a battery handle assembly, wherein the slot is inset relative to the perimeter of the packaging, and wherein the slot comprises:
      a loading portion having a width that is greater than a width of the tab;
      a locking portion having a width that is less than the width of the tab; and
      a retention feature disposed between the loading portion and the locking portion of the slot, wherein the retention feature is configured to compress to allow the tab to pass from the loading portion of the slot and into the locking portion of the slot to secure the tab within the slot, and configured to subsequently expand to block the tab from freely returning to the loading portion of the slot.

21. The lead-acid battery of claim 20, wherein the top portion of the cover of the packaging includes a recessed portion that includes a vent feature, wherein the vent feature is configured to release gas accumulated within the packaging during operation of the lead-acid battery, and configured to block an ignition source from entering the packaging of the battery.

22. The lead-acid battery of claim 20, wherein the cover of the packaging includes a drainage channel that is fluidly coupled to the slot, wherein the drainage channel extends between the recessed portion in the top portion of the cover and a side portion of the cover to allow liquids to drain or allow gas to be released from the recessed portion, wherein the drainage channel is not obstructed by the tab when the tab is secured in the slot.

23. The lead-acid battery of claim 20, wherein the retention feature of the slot is configured to enter a snapping engagement with the tab within the locking portion of the slot.

* * * * *